106. COMPOSITIONS, COATING OR PLASTIC.
93
(No Model.)
J. WADLEIGH.
BUILDING BLOCK.
No. 291,114. Patented Jan. 1, 1884.
*Straw rolled flat*
*Binder of clay or cement or lime*
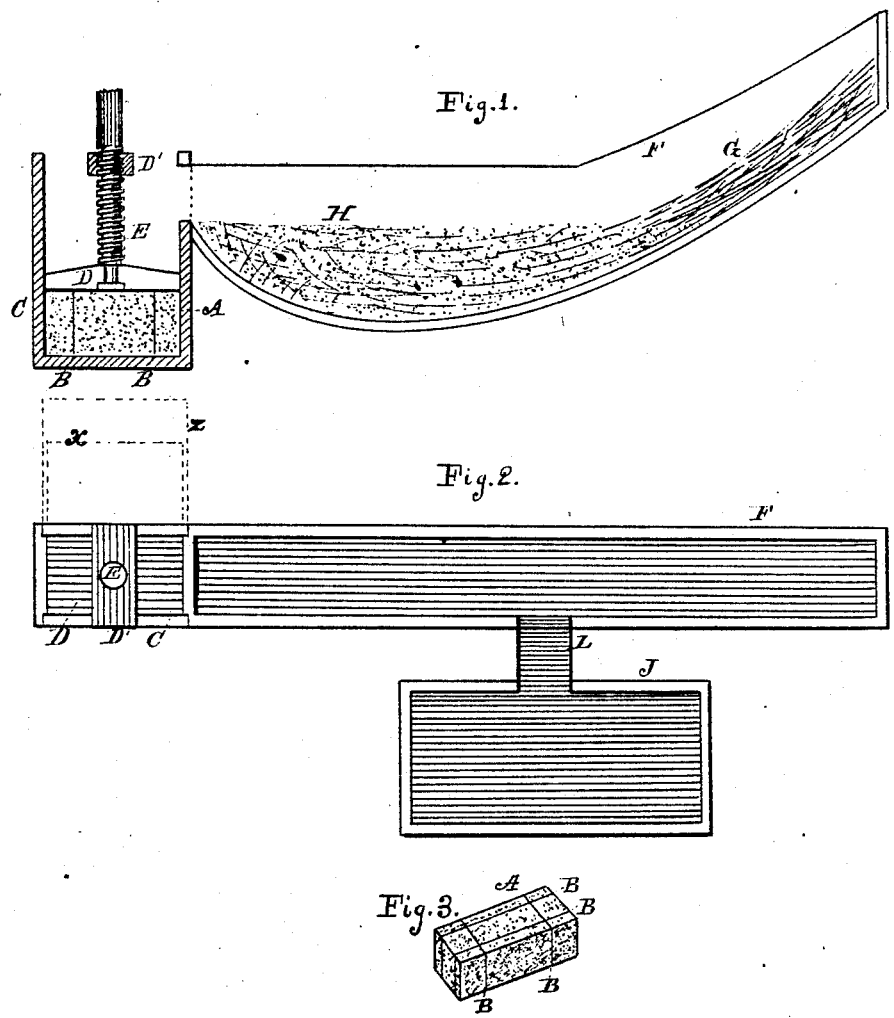
WITNESSES:
Chas. M. Smith
J. S. Huey
INVENTOR
Joseph Wadleigh
BY G. L. Chapin.
ATTORNEY.

UNITED STATES PATENT OFFICE.

JOSEPH WADLEIGH, OF MILKS GROVE, ILLINOIS.

BUILDING-BLOCK.

SPECIFICATION forming part of Letters Patent No. 291,114, dated January 1, 1884.

Application filed April 9, 1883. (No model.)

*To all whom it may concern:*

Be it known that I, JOSEPH WADLEIGH, of Milks Grove, in the county of Iroquois and State of Illinois, have invented a new and useful Improvement in Building-Blocks, of which the following is a specification, reference being had to the accompanying drawings, illustrating the improvement, in which—

Figure 1 is a longitudinal sectional elevation of a mixing apparatus and press, by means of which a form is given to my improved block; Fig. 2, a top or plan view of Fig. 1; Fig. 3, a perspective representation of one of the finished blocks pressed and bound for use.

The object of the present invention is to provide a building-block for the construction of one-story cheap houses, which shall be useful in districts where timber cannot be had. To produce the block, I use straw mixed with clay, sand, lime, or cement and clay, and press the material to bring the straw to a solid body—that is, press it flat, so as to make the block less pervious to water than when it is mixed with clay and dried in the sun, as adobe is made—and then bind the blocks with wire, to give to them the proper strength.

The invention is designed to be used in prairie countries where there is an abundance of straw, clay, and lime or cement to be obtained at a moderate cost, and for small or one-story buildings. The non-conducting qualities of clay and straw or lime and straw are well known; and the greatest objection to their use in cold and damp climates is their lack of durability. This feature I remedy sufficiently to render straw-blocks durable to be of value in the construction of small houses by pressing and binding them as before stated. The ordinary adobe is composed of clay, or clay and gravel, sand, &c., with sufficient straw only to hold the blocks in form molded.

My invention differs materially from the adobe, in that there is only so much clay or cement used as will fill up the interstices of the straw, whereby the blocks are much less liable to fall to pieces by the action of the elements; yet there is a sufficient amount of the clay or lime, or both, to make the blocks fireproof, so far as taking afire by a blaze or by sparks. The straw-stalks being pressed flat, there can no water enter the blocks, except by absorption, and not enough will enter in that manner to burst them where nothing but pressed straw is used in their composition with the cement or clay. Where blocks are formed of clay without so much straw as to tie the clay together, wire-tying would be of no advantage, because the clay itself would hold together, it being sun-dried; but when the straw is pressed flat the blocks are liable to expand before being laid unless bound. The Egyptian brick mentioned in Genesis were of the adobe kind, and not pressed, but molded with straw to tie them together. My blocks cannot be made without a press, and will expand without being wired or tied.

Any form of press may be employed to compact the blocks, one form being shown at C D D' E, which answers the purpose. It is necessary, however, that the press-box should be slotted out for the convenience of binding the blocks with wire B B, in the same manner or similar to tying hay-bales.

In putting my invention into practice in the cheapest manner, I find that a mixing-box, F, with a curved bottom projecting down somewhat below the point where the material G is fed to the press, and that a mixing-box, J, at the side of the box F, are a convenient means for mixing the clay or cement before it is let into the straw, (shown at H.) The plunger D of the press being raised up, the straw mixed with the cement is fed by a rake or like instrument to the press, Figs. 1 and 2, care being taken to feed enough clay or cement to fill the interstices of the straw. The blocks are then pressed and bound with wire B B lengthwise, and also crosswise, if greater strength be required. The sides of the press-box are intended to be opened for the removal of the block, as shown by dotted lines Z, Fig. 2, the block removed being shown by dotted lines X. Other means may be employed to mix and press the material into blocks; but I find the apparatus shown to be cheap and to fully answer the purpose.

I claim as new and desire to secure by Letters Patent—

1. A building-block composed chiefly, as to its bulk, of straw pressed flat, with so much concrete or clay intermixed as to cement the pressed straw together, and the blocks bound together by wire, as specified.

2. In apparatus for manufacturing building-blocks which are composed of pressed straw and concrete, the combination of the curved-bottomed mixing-trough, the clay or cement mixing trough connected therewith, and the press connected with the curved mixing-trough, as specified.

January 23, 1883.

JOSEPH WADLEIGH.

Witnesses:
G. L. CHAPIN,
R. W. WADLEIGH.